United States Patent
Johse

[11] Patent Number: 5,918,649
[45] Date of Patent: Jul. 6, 1999

[54] AEROSOL CAN DISPOSAL APPARATUS HAVING A REMOVABLE REFUSE STORAGE LINER

[76] Inventor: David G. Johse, 1429 Northview Dr., Angleton, Tex. 77515

[21] Appl. No.: 09/018,377

[22] Filed: Feb. 4, 1998

[51] Int. Cl.[6] ............................................ B65B 3/04
[52] U.S. Cl. ............................ 141/330; 141/97; 141/98; 222/5; 222/83.5; 222/87
[58] Field of Search .................... 141/51, 97, 98, 141/329, 330; 222/5, 83, 83.5, 87, 88

[56] References Cited

U.S. PATENT DOCUMENTS

| | | | |
|---|---|---|---|
| 2,008,807 | 7/1935 | Williams | 222/87 |
| 3,333,735 | 8/1967 | Odasso | 222/5 |
| 3,370,752 | 2/1968 | Abler | 222/83.5 |
| 4,349,054 | 9/1982 | Chipman et al. | 141/330 |
| 4,407,341 | 10/1983 | Feldt et al. | 141/97 |
| 4,459,906 | 7/1984 | Cound et al. | 222/87 |
| 4,500,015 | 2/1985 | Penney | 222/83.5 |
| 5,088,526 | 2/1992 | Nash | 141/1 |
| 5,163,585 | 11/1992 | Campbell | 222/5 |
| 5,174,344 | 12/1992 | Gonzalez-Miller et al. | 141/329 |
| 5,220,947 | 6/1993 | Cauquil et al. | 141/329 |
| 5,271,437 | 12/1993 | O'Brien et al. | 141/51 |
| 5,322,093 | 6/1994 | O'Neil | 141/51 |
| 5,365,982 | 11/1994 | O'Neill | 141/51 |
| 5,385,177 | 1/1995 | O'Neil | 141/1 |
| 5,441,088 | 8/1995 | O'Neill et al. | 141/51 |
| 5,558,140 | 9/1996 | Clark, II | 141/98 |

*Primary Examiner*—J. Casimer Jacyna
*Attorney, Agent, or Firm*—Joseph N. Breaux

[57] ABSTRACT

An aerosol can disposal apparatus having an inlet chute provided with a retractable puncturing member which punctures the side of the aerosol can and a waste container which receives the punctured aerosol can via the inlet chute. The waste container is lined with a removable refuse liner having placed therein an absorbing material for removing harmful ingredients from the evacuating contents of the punctured aerosol can. The waste container is dimensioned to accumulate therein a large number of aerosol cans before the need to remove the accumulated aerosol cans and replace the removable refuse liner.

10 Claims, 1 Drawing Sheet

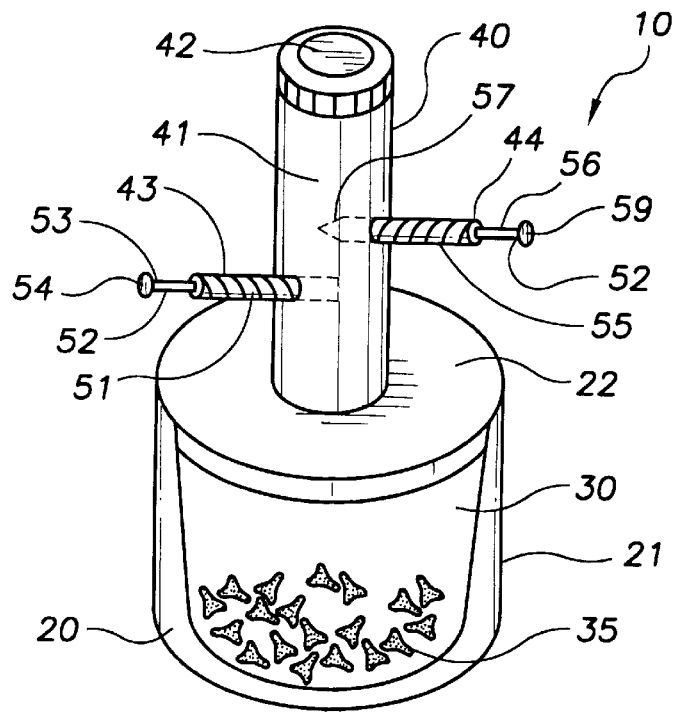
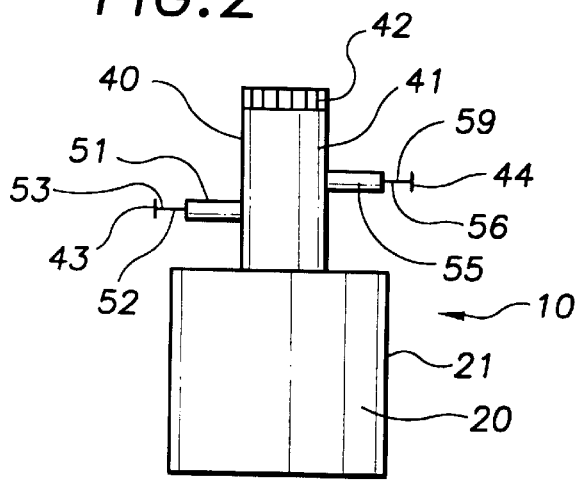
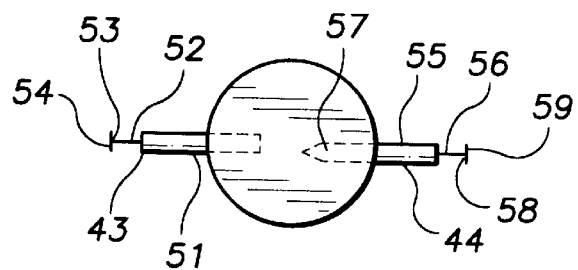

AEROSOL CAN DISPOSAL APPARATUS HAVING A REMOVABLE REFUSE STORAGE LINER

TECHNICAL FIELD

The present invention relates to aerosol can disposal apparatuses and, more particularly, to an aerosol can disposal apparatus having an inlet chute provided with a retractable puncturing member which punctures the side of the aerosol can and a waste container which receives the punctured aerosol can via the inlet chute. The waste container is lined with a removable refuse liner having placed therein an absorbing material for removing harmful ingredients from the evacuating contents of the punctured aerosol can. The waste container is dimensioned to accumulate therein a large number of aerosol cans before the need to replace the removable refuse liner.

BACKGROUND OF THE INVENTION

Aerosol cans are used to expel therefrom liquid materials in the form of a mist or foam. Therefore, aerosol cans are used to store therein various types of products ranging from hair sprays to household cleaning products to bug killers. As a result, a variety of aerosol cans can be readily found in most all households and commercial establishments.

Recycling of various products such as plastics and paper is known. However, recycling of aerosol cans has not been required. Moreover, one of the biggest challenges with aerosol can disposal and recycling is that the contents in aerosol cans may not be fulled spent. When an aerosol can with unspent contents is heated via the rays of the sun such as the case in landfill environments, the aerosol can has the propensity to explode. As can be appreciated, un-punctured aerosol cans left in landfills or other environments where the temperature is not controlled can be hazardous.

In most instances, federal regulations prohibit the disposal of un-punctured aerosol cans in landfills. Furthermore, other regulations and proposed regulations seek to prohibit venting of the unspent contents of the aerosol cans to the atmosphere because of the harmful effects to the environment. One of the biggest concerns with the venting of unspent contents of the aerosol cans is the release of chlorofluorocarbons and other propellants considered to be harmful to the atmosphere.

Several devices have been patented which are aimed at aerosol can recycling or disposal systems.

U.S. Pat. No. 5,441,088, by O'Neill et al., entitled "LP GAS CAN AND GAS RECYCLING APPARATUS"; U.S. Pat. No. 5,385,171, by O'Neil, entitled "AEROSOL CAN RECYCLING SYSTEM"; U.S. Pat. No. 5,365,982, by O'Neil, entitled "AEROSOL CAN COMPACTION AND EVACUATION APPARATUS"; and U.S. Pat. No. 5,322,093, by O'Neil, entitled "AEROSOL CAN PROPELLANT RECOVERY SYSTEM" disclose a system having a can feed hopper which feeds a can via a pneumatically controlled feed finger operated by an air line which releases one can at a time from a series of aerosol cans into a sloped chute. The slope of the chute allows the can to slide downwardly into a compaction cylinder. Prior to compaction of the can, the contents of the can is first evacuated. A penetrating need is provided to puncture the underside of the can.

U.S. Pat. No. 5,271,437, by O'Brien et al., entitled "AEROSOL CAN WASTE DISPOSAL DEVICE" discloses a device having a waste container such as a conventional 55 gallon drum. The can waste disposal device also comprises a cylinder for receiving an aerosol can. The cylinder is provided with piercing or puncturing means which punctures the bottom of a container to evacuate the gases or liquid in the container as a force is applied to the aerosol can to puncture the bottom side of the aerosol can. The evacuated gases or liquid is channeled into the drum. The drum is provided with a gas exhausting means which is used to remove gases from the waste container. A filter may be provided to remove harmful ingredients from the gases.

U.S. Pat. No. 5,088,526, by Nash, entitled "METHOD FOR DISPOSAL OF AEROSOL SPRAY CONTAINERS" discloses a method of disposal of aerosol dispensers which comprises cooling the aerosol dispenser and its contents to a temperature below which the propellant exhibits a substantial vapor pressure (i.e., below the boiling points(s) of the propellant. After the cooling stage, the aerosol dispenser is than punctured. The cold liquefied propellant and any additional liquid contents of the aerosol dispenser may than be drained without any danger of propellant release to the atmosphere into a collection container capable of accommodating the vapor pressure of the propellant at ambient temperature. The propellant may be recovered from the container and introduced into suitable containers for transport and ultimate reuse or disposal.

While each of the above aerosol disposal apparatuses functions as desired, none of them have an inlet chute provided with a retractable puncturing member which punctures the side of the aerosol can and a waste container which receives the punctured aerosol can via the inlet chute wherein the waste container is lined with a removable refuse liner having placed therein an absorbing material for removing harmful ingredients from the evacuating contents of the punctured aerosol can.

As will be seen more fully below, the present invention is different in structure, methodology and approach from that of the prior aerosol can disposal apparatuses.

SUMMARY OF THE INVENTION

The preferred embodiment of the aerosol can disposal apparatus of the present invention solves the aforementioned problems in a straight forward and simple manner. What is provided is an aerosol can disposal apparatus having an inlet chute provided with a retractable puncturing member which punctures the side of the aerosol can and a waste container which receives the punctured aerosol can via the inlet chute. The waste container is lined with a removable refuse liner having placed therein an absorbing material for removing harmful ingredients from the evacuating contents of the punctured aerosol can. The waste container is dimensioned to accumulate therein a large number of aerosol cans before the need to replace the removable refuse liner.

The aerosol can disposal apparatus of the present invention for puncturing and disposing of at least one aerosol can comprises: a waste container; an inlet chute coupled to said waste container and having a cylindrical contour to provide a path to said waste container; a retractable stop bar member, perpendicularly coupled to said inlet chute, which provides an obstruction in said path when said retractable stop bar member is in a non-retracted state; and, a retractable puncturing member perpendicularly coupled to said inlet chute which punctures a side of an aerosol can of said at least one aerosol can when in a puncturing state wherein said aerosol can moves downwardly in said path into said waste container under gravitational forces when said retractable stop bar member and said retractable puncturing member are each in a retracted state.

The aerosol can disposal apparatus of the present invention further comprises: a removable refuse liner contoured to the dimensions of said waste container to line inner walls of said waste container; and, an absorbing material embedded in a bottom of said removable refuse liner which filters/ absorbs ingredients of evacuating contents of the punctured aerosol can.

In view of the above, an object of the present invention is to provide an aerosol can disposal apparatus which provides a closed system to puncture an aerosol can, prevent the release of the harmful ingredients of evacuating contents to the atmosphere, absorb the harmful ingredients of the evacuating contents of the aerosol can, and accumulate punctured aerosol cans. The accumulated punctured cans may be removed from the closed system for further disposal or recycling thereof.

Another object of the present invention is to provide an aerosol disposal apparatus which can accumulate therein a large number of aerosol cans which can than be simultaneously removed via the removable refuse liner for further disposal or recycling of such aerosol cans.

A further object of the present invention is to provide such an aerosol disposal apparatus with an inlet chute which allows an aerosol can to be quickly punctured and immediately thereafter transferred to the waste container. The harmful Ingredients of the evacuating contents of the aerosol are absorbed by the absorbing material in the bottom of the removable refuse liner.

It is a still further object of the present invention to provide an aerosol can disposal apparatus comprising an inlet chute which is a cylindrical conduit having a closable lid, a retractable stop bar, and a retractable puncturing member. The retractable stop bar member when in its non-retracted state provides an obstruction in the path of the aerosol can in the inlet chute to prohibit the downward movement of the aerosol can out of the inlet chute and into the waste container when the aerosol can is initially inserted into the inlet chute. The retractable puncturing member when injected into the side of the aerosol can punctures the aerosol can to allow the contents of the aerosol to evacuate therefrom. When the retractable stop bar member and the retractable puncturing member are in their retracted state, the punctured aerosol can is free to move downward into the waste container under the forces of gravity.

In view of the above objects, it is a feature of the present invention to provide an aerosol disposal apparatus which is simple to use.

Another feature of the present invention is to provide an aerosol disposal apparatus which is relatively simple structurally.

It is a further feature of the present invention is to provide an aerosol disposal apparatus which is inexpensive and simple to manufacture.

It is a still further feature of the present invention to provide an aerosol disposal apparatus which does not require a significant amount of labor to operate.

It is a still further feature of the present invention to provide an aerosol disposal apparatus which allows the removable refuse liner to be easily and effortlessly removed for further disposal or recycling of the accumulated aerosol cans and allows the removable refuse liner to be easily and effortlessly replaced with a fresh removable refuse liner.

It is a still further feature of the present invention to provide an essentially maintenance free aerosol can disposal apparatus which essentially requires only the removal and replacement of the removable refuse liner when the liner is full. Thereby, the removable refuse liner and absorbing material are replaced simultaneously.

An advantage of the aerosol can disposal apparatus is that time is not wasted to permit the contents of an aerosol can to be essentially fully evacuated prior to transferring the aerosol can in the waste container for disposal therein.

The above and other objects, features and advantages of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 illustrates a perspective view of the preferred embodiment of aerosol can disposal apparatus of the present invention having the waste container shown in outline to permit illustration of the removable refuse liner;

FIG. 2 illustrates a side view of the aerosol can disposal apparatus of the embodiment of FIG. 1; and, FIG. 3 illustrates a top view of the inlet chute illustrating the puncturing state of the retractable puncturing member and the non-retracted state of the retractable stop bar member.

DESCRIPTION OF THE EXEMPLARY EMBODIMENT

Referring now to the drawings, and in particular FIGS. 1–3, the aerosol can disposal apparatus of the present invention is designated generally by the numeral 10. Aerosol can disposal apparatus 10 is comprised of waste container 20, removable refuse liner 30, absorbing material 35 and inlet chute 40 wherein the inlet chute is equipped with retractable stop bar member 43 and retractable puncturing member 44.

Waste container 20 comprises cylindrical hollow housing member 21 having a bottom wall and lid member 22 wherein lid member 22 is capable of being opened. In the exemplary embodiment, waste container 20 is essentially a 30 or 55 gallon drum container. Nevertheless, any size waste container may be used. However, an increase in the size of waste container 20 increases the number of aerosol cans which can be accumulated within waste container 20. The drum container may be made of steel or aluminum or the type of durable materials.

Removable refuse liner 30 functions as a bag for collecting therein punctured aerosol cans wherein one end of removable refuse liner 30 is closed and the other end thereof is open. Removable refuse liner 30 is similar in design to a traditional plastic bag which is used to line the inner walls of a garbage can. In the exemplary embodiment, removable refuse liner 30 is made of heavy gauge polyethylene. Nevertheless, other heavy duty material may be used.

Removable refuse liner 30 is contoured to the dimensions of waste container 20 for lining the inner walls of waste container 20. The close end of removable refuse liner 30 supports therein absorbing material 35.

When removable refuse liner 30 is received in waste container 20, absorbing material 35 provides a filtering bed which covers a substantial portion of the surface area of the bottom wall of waste container 20. Henceforth, aerosol can disposal apparatus 10 is provided with a filtering/absorbing mechanism which has a relatively large surface area to filter and absorb the harmful ingredients of the evacuating contents of the aerosol can. The relatively large surface area significantly increases filtering/absorption capacity of aerosol can disposal apparatus 10 as a large number of punctured aerosol cans are disposed of in waste container 20.

In the exemplary embodiment, absorbing material 35 is comprised of activated charcoal. Nevertheless, other suitable filtering/absorbing material may be substituted.

As can be appreciated, the size of waste container 20 lined with removable refuse liner 30 of aerosol disposal apparatus 10 can accumulate therein a large number of aerosol cans which can than be simultaneously removed via removable refuse liner 30 for further disposal or recycling of such aerosol cans. Furthermore, as removable refuse liner 30 is replaced so is absorbing material 35 which provides the filtering/absorbing mechanism. The design simplicity of aerosol can disposal apparatus 10 is essentially maintenance free wherein apparatus 10 essentially requires only the removal and replacement of the removable refuse liner 30 when liner 30 is full. Moreover, the replacement of the removable refuse liner 30 automatically replaces the absorbing material 30.

The design simplicity and the inherent operational simplicity described further below allows aerosol can disposal apparatus 10 to be used in any environment such as at landfills, commercial establishments which discard a large volume of aerosol cans, or maybe used by individual recyclers.

Inlet chute 40 comprises cylindrical conduit 41 having closable lid 42, retractable stop bar member 43 and retractable puncturing member 44. The bottom end of cylindrical conduit 41 is open and is securely coupled to an aperture (not shown) formed in lid member 22 of waste container 20 to provide a opening for the transfer of the aerosol can from inlet chute 40 to waste container 20.

The top end of cylindrical conduit 41 is provided with closable lid 42 wherein when closable lid 42 is opened, an aerosol can can be inserted into cylindrical conduit 41. After, the aerosol can is inserted into cylindrical conduit 41, cylindrical conduit 41 can be sealed via closable lid 42. Closable lid 42 may be hingably coupled to the top end of cylindrical conduit 41. Nevertheless, the top end of cylindrical conduit 41 may be threaded for screwably receiving closable lid 42. Nevertheless, other type of closable lid designs may be substituted.

Cylindrical conduit 41 is dimensioned to accommodate therein a variety of aerosol can dimensions wherein aerosol cans have varying lengths and diameters.

Retractable stop bar member 43 comprises conduit 51 for slidably receiving therein shaft member 52. Conduit 51 is perpendicularly coupled to the outer wall of cylindrical conduit 41 wherein there is a clear unobstructed path for the insertion of shaft member 52 into the path of the aerosol can within inlet chute 40 to place retractable stop bar member 49 in its non-retracted state. When shaft member 52 is inserted into the path of the aerosol can, via a force applied thereto, within inlet chute 40, retractable stop bar member 43 is in its non-retracted state to provide an obstruction within inlet chute 40 to prevent the downward movement of the aerosol can.

Shaft member 52 is slidably retractable from the path of the aerosol can within inlet chute 40 and into conduit 51. When shaft member 52 is fully retracted into conduit 51 such that shaft member 52 does not hinder to downward movement of the aerosol can, retractable stop bar member 43 is in its retracted state.

Retractable puncturing member 44 comprises conduit 55 for slidably receiving therein shaft member 56. One distal end 57 of shaft member 56 is pointed to allow shaft member 56 to easily pierce the side of the aerosol can when a force of pressure is exerted to shaft member 56 to force shaft member 56 into the side of the aerosol can. Conduit 55 is perpendicularly coupled to the outer wall of cylindrical conduit 41 wherein there is a clear unobstructed path for the insertion of shaft member 56 into the side of the aerosol can within inlet chute 40. Shaft member 56 is slidably retractable from the side of the aerosol can within inlet chute 40 and into conduit 55. When shaft member 56 is fully retracted into conduit 56 such that shaft member 52 does not hinder to downward movement of the aerosol can, retractable puncturing member 44 is in its retracted state. When shaft member 56 is inserted into the side of the aerosol can within inlet chute 40, retractable puncturing member 43 is in its puncturing state.

In the preferred embodiment, retractable puncturing member 44 is perpendicularly coupled to the cylindrical conduit 41 of inlet chute 40 above retractable stop bar member 43 wherein retractable puncturing member 44 is positioned between closable lid 42 and retractable stop bar member 43.

End 53 of shaft member 52 and end 58 of shaft member 56 are provided with stop walls 54 and 59, respectively, wherein stop walls 54 and 59 limit the injection of shaft members 51 and 55, respectively, into inlet chute 40.

Retractable stop bar member 43 when in its non-retracted state prohibits the downward movement of the aerosol can out of inlet chute 40 and into waste container 20 when the aerosol can is initially inserted into inlet chute 40. Retractable puncturing member 44 when injected into the side of the aerosol can punctures the aerosol can to allow the contents of the aerosol can to be evacuate therefrom. When retractable stop bar member 43 and retractable puncturing member 44 are in their retracted state, the punctured aerosol can is free to move downward into the waste container under the forces of gravity.

Therefore, inlet chute 40 allows an aerosol can to be quickly punctured and immediately thereafter transferred to waste container 20 wherein the evacuating contents of the aerosol can are free to expel from the aerosol can for as long as is necessary to essentially evacuate the vapor pressure from the aerosol can. Thereby, while the aerosol cans are stored in waste container 20, the release of the vapor pressure is free to take place for as long as necessary. The harmful ingredients of the evacuating contents of the aerosol are absorbed by absorbing material 35 in the bottom of removable refuse liner 30.

As can be appreciated, aerosol can disposal apparatus 10 provides a closed system to puncture an aerosol can, prevent the release of the harmful ingredients of the evacuating contents to the atmosphere, absorb the harmful ingredients of the evacuating contents of the aerosol can and accumulates punctured aerosol cans. The accumulated punctured aerosol cans are removed from the closed system for further disposal or recycling thereof.

It is noted that the embodiment of the aerosol can disposal apparatus described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An aerosol can disposal apparatus for puncturing and disposing of at least one aerosol can comprising:

a waste container:

an inlet chute coupled to said waste container and having a cylindrical contour to provide a path to said waste container;

a retractable stop bar member, perpendicularly coupled to said inlet chute, which provides an obstruction in said path when said retractable stop bar member is in a non-retracted state; and, a retractable puncturing member perpendicularly coupled to said inlet chute which punctures a side of an aerosol can of said at least one aerosol can when in a puncturing state wherein said aerosol can moves downwardly in said oath into said waste container under gravitational forces when said retractable stop bar member and said retractable puncturing member are each in a retracted state;

said inlet chute comprising a closable lid for closing said inlet chute.

2. The aerosol can disposal apparatus of claim 1, wherein said retractable puncturing member is positioned between said closable lid and retractable stop bar member.

3. An aerosol can disposal apparatus for puncturing and disposing of at least one aerosol can comprising:

a waste container;

a removable refuse liner contoured to the dimensions of said waste container to line inner walls of said waste container;

an absorbing material embedded in the bottom of said removable refuse liner which filters/absorbs ingredients of evacuating contents of the punctured aerosol can;

an inlet chute coupled to said waste container and having a cylindrical contour to provide a path to said waste container;

a retractable stop bar member, perpendicularly coupled to said inlet chute, which provides an obstruction in said path when said retractable stop bar member is in a non-retracted state; and, a retractable puncturing member perpendicularly coupled to said inlet chute which punctures a side of an aerosol can of said at least one aerosol can when in a puncturing state wherein said aerosol can moves downwardly in said path into said waste container under gravitational forces when said retractable stop bar member and said retractable puncturing member are each in a retracted state.

4. The aerosol can disposal apparatus of claim 3, wherein said waste container comprises a bottom wall and a lid member; and wherein when said removable refuse liner is received in said waste container said absorbing material provides a filtering bed which covers a substantial portion of a surface area of said bottom wall of said waste container.

5. The aerosol can disposal apparatus of claim 3, wherein said absorbing material is activated charcoal.

6. The aerosol can disposal apparatus of claim 3, wherein said removable refuse inner is made of heavy gauge polyethylene.

7. The aerosol can disposal apparatus of claim 3, wherein said retractable puncturing member comprises:

a conduit perpendicularly coupled to said inlet chute;

a shaft member slidably received in said conduit having one distal end thereof pointed to allow said shaft member to puncture the side of said aerosol can when said retractable puncturing member is in said puncturing state wherein a force of pressure is exerted to said shaft member to force the pointed distal end of said shaft member into the side of said aerosol can.

8. The aerosol can disposal apparatus of claim 3, wherein said retractable stop bar member comprises:

a conduit perpendicularly coupled to said inlet chute;

a shaft member slidably received in said conduit to allow said shaft member to obstruction the path in said inlet chute when said retractable stop bar member is in said non-retracted state wherein a force of pressure is exerted to said shaft member to slid said shaft member into the path of said aerosol can.

9. The aerosol can disposal apparatus of claim 3, wherein said inlet chute comprises a closable lid for closing said inlet chute.

10. The aerosol can disposal apparatus of claim 9, wherein said retractable puncturing member is positioned between said closable lid and retractable stop bar member.

* * * * *